(12) United States Patent
Laredius

(10) Patent No.: US 8,303,185 B2
(45) Date of Patent: Nov. 6, 2012

(54) BEARING PLAY ADJUSTMENT

(75) Inventor: Jan Laredius, Sundsvall (SE)

(73) Assignee: Metso Paper, Inc. (FI)

( * ) Notice: Subject to any disclaimer, the term of this patent is extended or adjusted under 35 U.S.C. 154(b) by 685 days.

(21) Appl. No.: 12/443,206

(22) PCT Filed: Sep. 5, 2007

(86) PCT No.: PCT/SE2007/050619
§ 371 (c)(1),
(2), (4) Date: Mar. 27, 2009

(87) PCT Pub. No.: WO2008/041919
PCT Pub. Date: Apr. 10, 2008

(65) Prior Publication Data
US 2010/0226602 A1 Sep. 9, 2010

(30) Foreign Application Priority Data
Oct. 2, 2006 (SE) ...................... 0602101

(51) Int. Cl.
*F16C 3/16* (2006.01)
(52) U.S. Cl. ....................... 384/316; 384/321
(58) Field of Classification Search ............... 384/313, 384/314, 315, 316, 317, 321, 476, 557, 448; 241/261.2
See application file for complete search history.

(56) References Cited

U.S. PATENT DOCUMENTS

| | | | | |
|---|---|---|---|---|
| 2,352,206 A | * | 6/1944 | Kendall | 384/476 |
| 3,317,258 A | * | 5/1967 | Hermann | 384/557 |
| 3,418,809 A | | 12/1968 | Kopp et al. | |
| 3,459,460 A | | 8/1969 | Kopp et al. | |
| 4,402,559 A | * | 9/1983 | Shibata et al. | 384/476 |
| 4,514,123 A | * | 4/1985 | Johnstone et al. | 384/448 |
| 4,626,111 A | | 12/1986 | Swasey et al. | |
| 6,261,003 B1 | | 7/2001 | Dusserre-Telmon et al. | |
| 6,913,390 B2 | * | 7/2005 | Inoue et al. | 384/476 |

FOREIGN PATENT DOCUMENTS

DE 3826945 A1 2/1990
JP 4-025343 A 1/1992

OTHER PUBLICATIONS

Supplementary European Search Report, EP 07808856, dated Oct. 7, 2010.
International Search Report based PCT/SE2007/050619, dated Jan. 28, 2008, 3 pgs.

* cited by examiner

*Primary Examiner* — Michael P Ferguson
(74) *Attorney, Agent, or Firm* — Lerner, David, Littenberg, Krumholz & Mentlik, LLP

(57) ABSTRACT

A rotating machine is disclosed including a rotor, a stator, a radial bearing arranged for supporting radial forces between the rotor and the stator by mechanical contacts and a bearing housing. The bearing housing is provided in the stator or the rotor in direct mechanical contact with the radial bearing and the rotating machine further comprises a thermal energy exchanger, arranged in the bearing housing, and a thermal controller. The thermal energy exchanger is capable of providing both heat and cold, and the thermal controller is arranged to control the thermal energy exchange during operation of the rotating machine. The rotating machine is typically a large machine, such as a refiner. A method for vibration control of a rotating machine is also disclosed comprising measuring properties related to vibrational properties.

7 Claims, 4 Drawing Sheets

BEARING PLAY ADJUSTMENT

FIELD OF THE INVENTION

The present invention relates in general to rotating machines and in particular to bearing arrangements at such machines.

BACKGROUND OF THE INVENTION

In all rotating machines, there are some sort of radial bearings between the rotor part and the stator part. Most radial bearing types are arranged for supporting radial forces between a rotor and a stator by mechanical contacts. Typical examples of bearing types used as radial bearings are ball bearings, roller bearings and sliding bearings.

All these bearings are based on some kind of indirect mechanical contacts between the rotary and stationary part, play is an important factor. In an ideal case, a bearing would be play free, only permitting e.g. a thin film of lubricant between the moving parts. However, in typical cases a small play is present between the stator and the bearing and/or between the bearing and the rotor.

When rotating machines are operating, heat is produced, e.g. in the bearings. The heat causes the bearings to expand. If the expansion becomes larger than the available play, the rotating machine will be severely damaged. In order to allow operation at different temperatures, an extended radial play is typically provided for the bearings. The play has furthermore to be so large that it can handle a worst case scenario, i.e. the highest temperature at which operation of the rotating machine can take place. This results in that a rotating machine normally operates with a play that is somewhat larger than the optimum play.

The size of the play has impacts on the properties of the rotating machine. A large play will typically increase wear, and give a higher level of vibrations and noise in the bearing and its connected parts. Moreover, a rotor carried by a bearing will also experience different stiffness depending on the play. Generally, a small play is to prefer. At substantially no plays, resonance frequencies for the rotor can be well estimated and thereby avoided. At small plays, the vibration behaviour is somewhat different and difficult to calculate in advance. At very large plays, torques of the rotor and external forces acting on the rotor may cause the rotor to enter into a more or less chaotic condition.

The impact of the bearing plays becomes more important for large machines. In particular, large machines, having a large mass present at a large diameter of the rotor, are subjects for great concern. One typical such rotating machine is a refiner, used for refining of fibre materials, where grinding plates with substantial radial extension are rotated around an axis.

There are approaches in prior art to compensate for temperature induced play changes. In U.S. Pat. Nos. 3,418,809, 3,459,460 and 4,626,111, bearing arrangements with rollers arranged at tapered surfaces are disclosed, which by means of hydrostatic pressure, electrical heated expansion components or heat expanding bars causes a movement of the rollers. This results in a changed play. Such arrangements have the disadvantage of including additional features around and within the bearing and thereby increasing the risk for damages during operation.

In U.S. Pat. No. 6,261,003, an apparatus for controlling radial play of a roller bearing is disclosed. A lubricant drainage circuit outside a roller bearing is fitted such that an output drainage through a drained ring is controlled by providing drainage channels crossing the ring and having different inclinations in a circumferential direction of the drained ring. The lubricant is thereby utilized to reduce the temperature of the outer ring, giving a controlled play. The temperature of the lubricant is in turn determined by friction generated in the bearing. There are, however, a number of disadvantages with such a solution. The temperature control is connected to the flow and temperature of the lubricant. A flow and temperature advantageous for the temperature control aspect may not always be advantageous also for the lubricating purposes. Furthermore, the abilities to control the temperature are limited by the maximum lubricant flow and the temperatures at other parts of the bearing, in turn being dependent e.g. on load and friction. Moreover, the proposed approach can only control the temperature in one direction, typically a cooling of the outer ring and thereby increasing the play.

When starting a cold rotating machine that normally operates at a certain elevated temperature, the play is typically larger than at continuous operation. A play reduction during the starting-up phase can not be achieved by the approach presented in U.S. Pat. No. 6,261,003. There is thus a remaining risk for damaging operation, e.g. due to uncontrolled vibration states, before any steady-state operation is reached. Furthermore, the solution requires additional openings in the support surfaces of the bearing, which reduces the mechanical strength and increases the wear.

Prior art solutions of bearing play compensation have different disadvantages. A general problem is, however, the introduction of weakening or disturbing features within the bearing.

One object of the present invention is to provide a bearing system, which improves the possibilities to control the bearing play without substantially influencing the operation of the bearing itself. A further object is to provide a bearing play control system being able to both increase and decrease the play. Yet an object is to allow for an improved control of vibration behaviours of rotating machines.

SUMMARY OF THE INVENTION

In accordance with the present invention, these and other objects have now been realized by the invention of the rotating machine comprising a rotor, a stator, a radial bearing arranged for supporting radial forces between the rotor and the stator by mechanical contacts, a bearing housing of at least one of the stator and the rotor, being in direct mechanical contact with the radial bearing, a thermal energy exchanger arranged in the bearing housing, the thermal energy exchanger being capable of providing both heat and cold, and thermal control means arranged to control thermal energy exchange of the thermal energy exchanger during operation of the rotating machine. In a preferred embodiment, the rotating machine further comprises a sensor arranged for measuring properties of at least one of the stator and the rotor, the sensor being connected to the thermal control means for providing signals associated with the measured properties, whereby the thermal control means is arranged to control the thermal energy exchange of the thermal energy exchanger in response to the measured properties. In a preferred embodiment, the measured properties of at least one of the stator rotor are associated with at least one of the bearing play and vibration behaviour In accordance with one embodiment of the rotating machine of the present invention, the sensor comprises a temperature sensor, arranged in the vicinity of the radial bearing, whereby the thermal control means is arranged to control the thermal energy exchange of the thermal energy exchanger for achieving a predetermined temperature at the temperature sensor.

In accordance with another embodiment of the rotating machine of the present invention, the sensor comprises a vibration sensor, arranged to monitor vibrations of the rotor, whereby the thermal control means is arranged to control the thermal energy exchange of the thermal energy exchanger for keeping the vibrations below a predetermined vibration level.

In accordance with another embodiment to the rotating machine of the present invention, the thermal energy exchanger comprises a cavity in the bearing housing, and the thermal control means is arranged for causing a flow of fluid through the cavity and for controlling a temperature of the fluid. Preferably, the fluid is water or oil.

In accordance with another embodiment to the rotating machine of the present invention, a thermal energy exchanger comprises a Peltier element, whereby the thermal control means is arranged for controlling the operation of the Peltier element.

In accordance with another embodiment to the rotating machine of the present invention, the bearing house is provided in the stator.

In accordance with another embodiment to the rotating machine of the present invention, the rotating machine comprises a constant speed rotating machine.

In accordance with another embodiment to the rotating machine of the present invention, the rotating machine exhibits a large mass with a large diameter of the rotor.

In accordance with the present invention, a refiner has been provided comprising a rotating machine, the rotating machine comprising a rotor, a stator, a radial bearing arranged for supporting radial forces between the rotor and the stator by mechanical contacts, a bearing housing of at least one of the stator and the rotor in direct mechanical contact with the radial bearing, a thermal energy exchanger arranged in the bearing housing, the thermal energy exchanger being capable of providing both heat and cold, and thermal control means arranged to control thermal energy exchange of the thermal energy exchanger during operation of the rotating machine.

In accordance with the present invention, a method has also been provided for vibration control for rotating machine comprising the steps of measuring properties of at least one of a stator and a rotor of the rotating machine, the properties being related to at lease one of bearing play and vibration behaviour, and controlling a thermal energy exchange in a bearing housing of at least one of the stator and the rotor in response to the measured properties. Preferably the measuring and controlling steps are performed during operation of the rotating machine.

In general words, according to a first aspect, a rotating machine has a rotor, a stator, a radial bearing arranged for supporting radial forces between the rotor and the stator by mechanical contacts and a bearing housing. The bearing housing is provided in the stator or the rotor in direct mechanical contact with the radial bearing. The rotating machine further comprises a thermal energy exchanger, arranged in the bearing housing, and a thermal control means. The thermal energy exchanger is capable of providing both heat and cold. The thermal control means is arranged to control the thermal energy exchange of the thermal energy exchanger during operation of the rotating machine. The rotating machine is typically a large machine, such as a refiner.

In a second aspect, a method for vibration control of a rotating machine comprises measuring of properties related to vibration properties of a stator and/or a rotor of the rotating machine. The method further comprises controlling of a thermal energy exchange in a bearing housing in the stator or the rotor in response of the measured properties. The thermal energy exchange allows provision of both heat and cold.

One advantage with the present invention is that it enables an easy control of bearing play, in turn enabling e.g. vibration control of in particular large rotating machines.

BRIEF DESCRIPTION OF THE DRAWINGS

The present invention, together with further objects and advantages there of, may best be understood by making reference to the following detailed description, taken together with the accompanying drawings, in which.

DETAILED DESCRIPTION

Throughout the drawings, the same reference numbers are used for similar or corresponding elements.

By having analyzed behaviours of refiners in pulp plants, it has been found that bearing play not only determines friction and wear properties, but is also closely connected with different types of vibration properties. By combining knowledge about preferred operating parameters at different operating conditions, a general understanding has developed that it is of importance to be able to control bearing play in different manners in different situations. Solutions only aiming in keeping the bearing play constant are thus of less importance.

Figure 1:
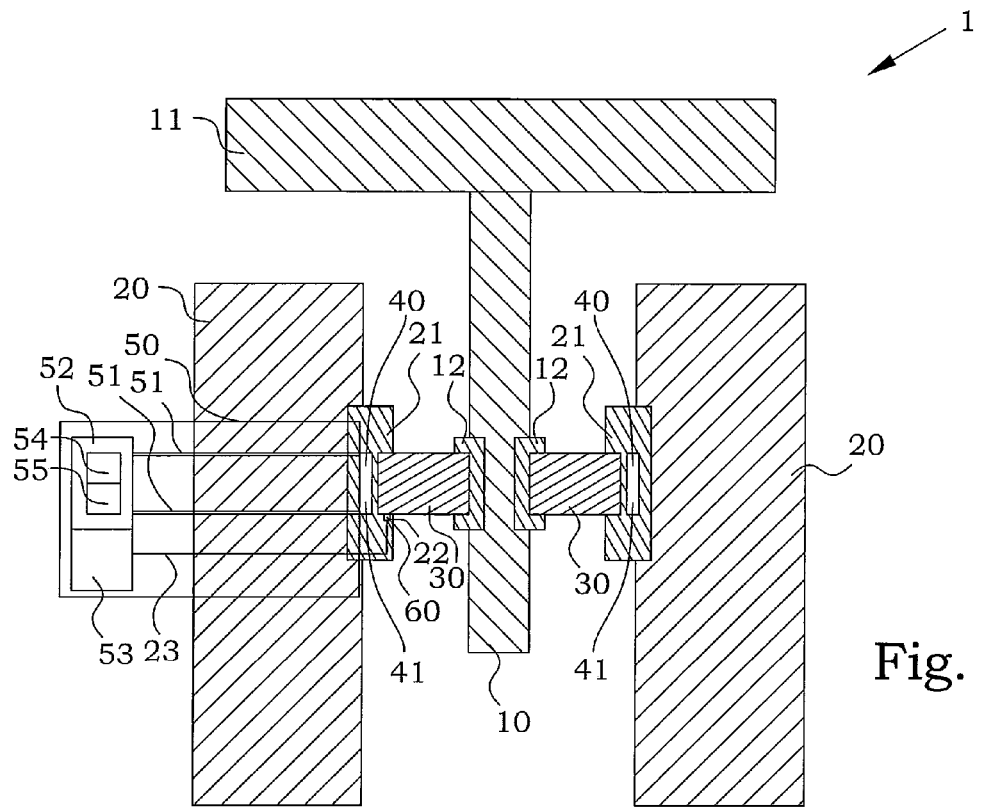
FIG. 1 is a side, elevational, schematic cross-sectional view of an embodiment of a rotating machine according to the present invention.

FIG. 1 is a schematic cross-section block diagram of an embodiment of a rotating machine 1 according to the present invention. A rotor 10 is arranged for relative rotary motion to a stator 20. The rotor 10 rotates a load 11, e.g. refiner discs. A radial bearing 30 is arranged for supporting radial forces between the 10 rotor and the stator 20 by means of mechanical contacts. The radial bearing 30 thereby provides a mechanical support of the rotor 10 e.g. via outer and inner rings, rollers or balls. In the present embodiment, the radial bearing 30 is a roller bearing. Typically, the rollers that at each moment are present in the lower part of the bearing mechanically carry the weight of the rotor 10. However, in other embodiments, depending on the application, the roller bearing may be any kind of bearing supporting radial forces between the 10 rotor and the stator 20 by means of mechanical contacts, e.g. a ball bearing or even a sliding bearing. One bearing housing 21 in the stator 20 and one bearing housing 12 in the rotor 10 are in direct mechanical contact with the radial bearing 30. A thermal energy exchanger 40 is arranged in the bearing housing 21 in the stator 20. The thermal energy exchanger 40 is in this embodiment constituted by a cavity 41 in the bearing housing 21 close to the outer part of the radial bearing 30. The cavity should preferably have a large surface against the bearing housing 21 in order to favour an efficient exchange of thermal energy. The cavity 41 is arranged to allow a fluid to flow through the cavity. Depending on the temperature of the fluid transported through the cavity 41, the thermal energy exchanger 40 is capable of providing both heat and cold to the bearing housing 21, and thereby also to the outer part of the radial bearing 30. In the present embodiment, water is used as the fluid, but other liquids, such as oil as well as gases can in other embodiments also be used for transporting heat and cold to the thermal energy exchanger 40.

In the present disclosure, the term "bearing housing" is used for any structure being direct mechanical contact with the radial bearing. The bearing housing can be a separate item, as e.g. indicated in FIG. 1. However, the bearing housing can also be a portion of the stator or rotor itself, having the same main purpose as a bearing housing and being provided in the absolute vicinity of the radial bearing. In other words, the bearing housing can be a separate unit or an integrated part of the stator or rotor.

A thermal control means 50 is arranged to control the thermal energy exchange to/from the thermal energy exchanger 40 during operation of the rotating machine 1. In this embodiment, the thermal control means 50 comprises conducts 51 for transporting the fluid to and from the cavity 41, to a fluid reservoir 52. The fluid reservoir 52 is further provided with a heater 54 and a cooler 55 to enable a temperature control of the fluid contained in the fluid reservoir 52. The thermal control means 50 also comprises a control unit 53, arranged for controlling the temperature of the fluid of the fluid reservoir 52 as well as for controlling the flow of fluid to and from the cavity 41.

In the present embodiment, a sensor 60 is arranged for measuring operation properties the rotating machine 1. In the present embodiment, the sensor 60 is a temperature sensor 22 arranged in the bearing housing 21 for monitoring a temperature in the vicinity of the outer part of the radial bearing 30. The temperature sensor 22 may be of any kind, e.g. a thermocouple. The sensor 60 is connected by a connection 23 to the control unit 53 of the thermal control means 50 for providing signals associated with the measured temperature. If the sensor is a thermocouple, the signal simply consists of a voltage difference between two wires. The control unit 53 of the thermal control means 50 is thereby arranged to control the thermal energy exchange of the thermal energy exchanger 40 in response of the measured properties. In the present embodiment, the control unit 53 is arranged to control the flow and temperature of the fluid through the cavity 41 for achieving a predetermined temperature at the temperature sensor 22.

Figure 2:
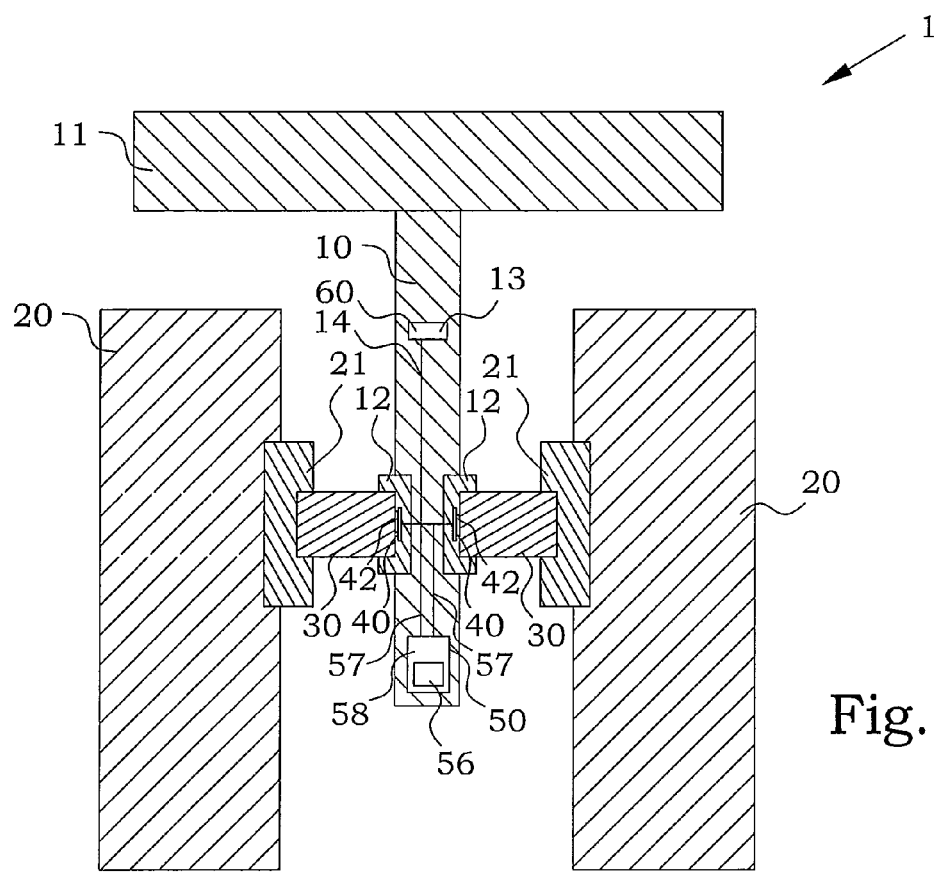
FIG. 2 is a side, elevational, schematic cross-sectional view of another embodiment of a rotating machine according to the present invention

FIG. 2 illustrates another embodiment of a rotating machine 1 according to the present invention. In this embodiment, the thermal energy exchanger 40 is arranged in the bearing housing 12 in the rotor 10. In the present embodiment, the thermal energy exchanger 40 is constituted by a Peltier element 42, being able to provide both heat and cold, depending on the direction of a current conducted through the Peltier element 42. The thermal control means 50 comprises in this embodiment a control unit 58 and electrical connections 57 to the Peltier element 42. The supply of electrical energy to the control unit 58 is preferably provided internally at the rotor 10. A generator 56 is arranged at the rotor 10 for converting the relative motion between the stator 20 and the rotor 10 to electrical energy. Such generator techniques are as such well known and are not further discussed here.

A similar system for providing heat and cold as in FIG. 1 would also be possible in the present embodiment. However, if the flow of fluid would cross the interface between the rotor 10 and stator 20, fluid connections allowing a relative rotation have to be provided.

The embodiment of FIG. 2 also comprises a sensor 60, in this case a vibration sensor 13. The vibration sensor 13 is connected to the control unit 58 by a connection 14. The vibration sensor 13 measures total vibration energy within the hearable frequency range of the rotor 10, and provides a voltage to the control unit 58 being proportional to this total vibration energy. The control unit 58 determines when the received voltage becomes too high, which means that the hearable noise from the rotating machine 1, indicative to unfavourable operation conditions, has increased to an unacceptable level, and controls the thermal energy exchange of the Peltier element 42 to avoid such increased noise level, i.e. for keeping the vibrations below a predetermined vibration level.

Figure 3:
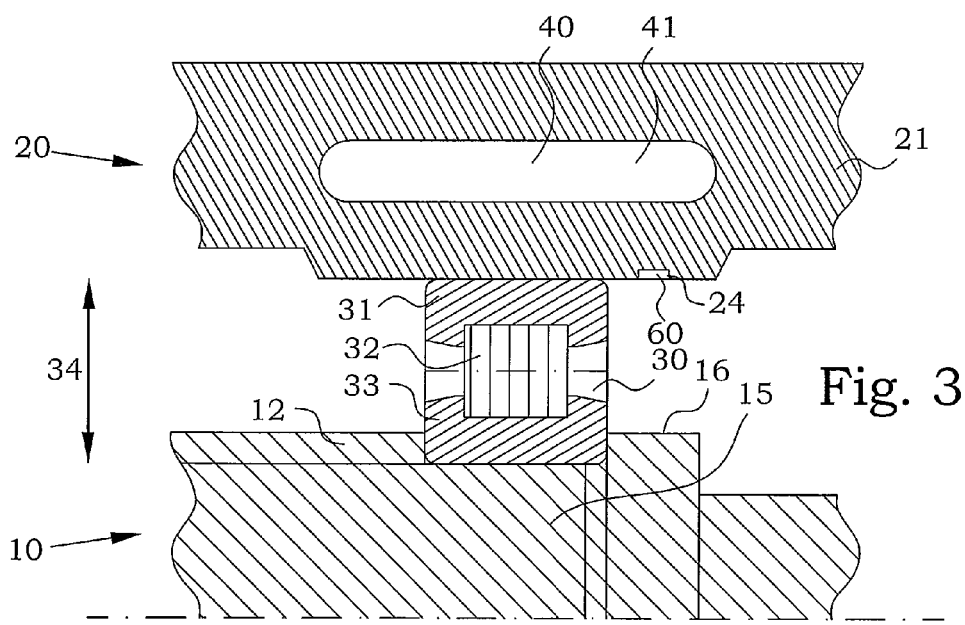
FIG. 3 is a side, elevational, cross-sectional view of a part of an embodiment of a rotating machine according to the present invention.

FIG. 3 is a cross-section illustration of a part of an embodiment of a rotating machine according to the present invention. In this embodiment, the thermal energy exchanger 40 comprises a cavity 41 arranged in the bearing housing 21 of the stator 20. An outer ring 31 of the radial bearing 30 supports against the bearing housing 21, and an inner ring 33 of the radial bearing 30 supports against the bearing housing 12. A roller 32 is arranged between the inner ring 33 and the outer ring 31. The radial bearing 30 thereby substantially fills a gap 34 between the rotor 10 and the stator 20. Thermal energy from the cavity 41 is easily conducted to the outer ring 31.

In the present embodiment, a sensor 60, in this case a distance sensor 24 is provided in the stator 20. The distance sensor 24 is arranged to measure a distance to a surface portion 16 of a shaft 15 of the rotor 10. A change in this distance corresponds to a change in the available gap 34. When the distance becomes too large, an extended play is present for the radial bearing 30. When the distance becomes too small, the play is reduced and there is an increased risk for bearing damages. In this way, a thermal control means may use distance measurements as input information for the purpose of controlling the thermal exchange from the cavity 41.

A typical system in which a rotating machine according to the embodiment in FIG. 3 may be implemented is in a refiner. A refiner is an apparatus for refining of fibre material. An example of such an equipment is disclosed e.g. in the published international patent application WO 93/23166. In a disk refiner, two opposed refining disks are moved in relation to each other. The disks have a significant extension perpendicular to the shaft, and heavy radial as well as longitudinal forces have to be carried by the bearing arrangements. The forces can amount to several tens of tons, and the bearing design is therefore of crucial importance for refiners. The bearing arrangements presented in the present disclosure are therefore advantageously applied to refiners.

Figure 4:
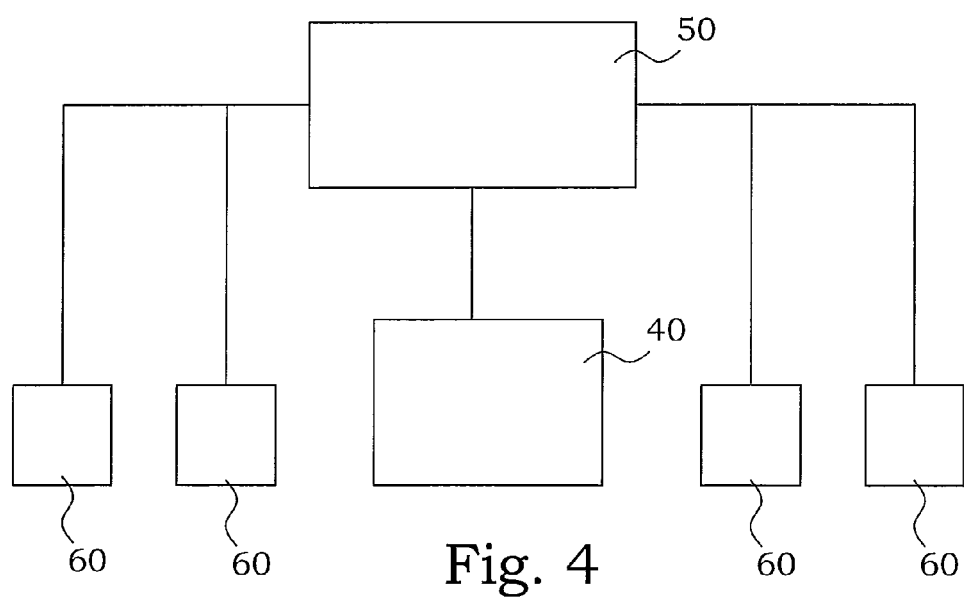
FIG. 4 is a schematic drawing of an arrangement for control of bearing play according to the present invention.

FIG. 4 is a schematic drawing of an arrangement for control of bearing play and thereby of vibration behaviour. One or several sensors 60 measures properties of the stator and/or the rotor, being associated with bearing play and/or vibration behaviour. One example of such a property can be temperature, in particular local temperature in the vicinity of the radial bearing. Another example is a physical measure corresponding to a distance between the stator and the rotor, i.e. a distance measure that is possible to associate to a gap distance for the radial bearing. Yet another example of a property of interest is some measure connected to vibrations. Such a measure can be a total vibration energy measure, as in the other embodiment above, or e.g. an amplitude measure for a certain frequency component. Also other vibration quantities may be of interest. Signals indicative to the measured properties are provided to the thermal control means 50.

Having access to information of this kind increase the possibilities to control the operation of the rotating machine in a better way during operation. In a general rotating machine, the unbalance vibrations are typically reduced by a reduced play in the bearing. Such behaviour may also be influenced by different inherent resonance frequencies of the rotor system. The play in the bearing affects the experienced bearing stiffness and thereby also the resonance behaviour. Natural frequency vibration modes occur in all rotordynamic systems due to un-balance and other disturbing forces acting on the rotating parts. If the rotating motor can be used at different speeds, resonance behaviours may be avoided by simply change the rotating speed. Normally, it is just a matter of changing the speed by 1-2 Hz in order to avoid such problems. However, in systems where the application requests a certain substantially constant speed, it may be difficult to avoid resonances. One possibility is then presented by the present invention in that the bearing play, and thereby the stiffness of the bearing can be adjusted, in any direction, to change the resonance behaviour sufficiently. The thermal control means 50 is therefore arranged to control the thermal energy exchange of the thermal energy exchanger 40. This is preferably performed also during operation of the rotating machine.

Figure 5A:
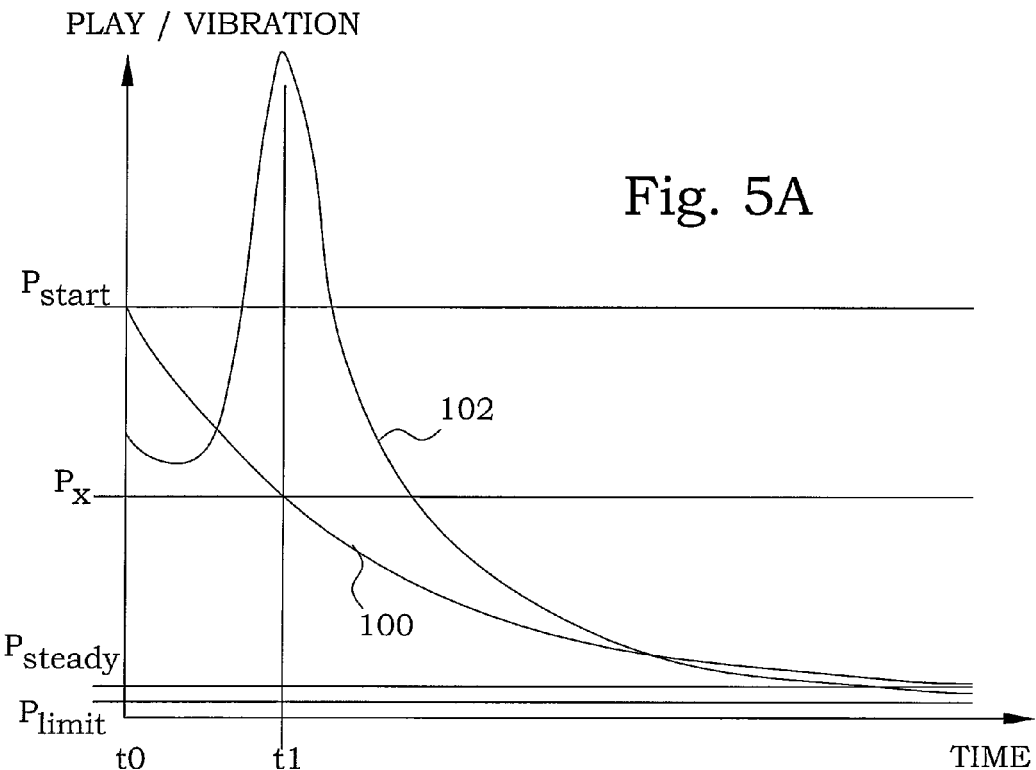
FIG. 5A is a graphical representation of the development of play and vibration for the present invention with time.

In rotating machine systems, in particular ones having a large mass at a large diameter of the rotor, an additional factor, the non-linear dynamics due to a certain clearance in rotor-dynamic systems becomes important. The rotor dynamics cooperates with the stiffness of the bearing and any disturbing forces, and may cause very unpredictable properties at different bearing play. This can be troublesome, in particular during the start-up phase of a motor. In FIG. 5A, a possible scenario is illustrated by a time diagram. A time t0, a rotating machine is started. The bearing has a temperature equal to the ambient temperature. Due to the thermal expansion, the rotating machine is designed with a larger play $P_{start}$ than optimum $P_{limit}$. The vibrations of the rotating machine, represented by the curve 102 are thus typically higher than for a steady-state condition. During the initial operation, the temperature increases and the play decreases in a corresponding manner, as seen from the curve 100. The vibrations also change. However, in this example, the rotor system has an inherent resonance frequency close to an overtone of the operation speed. When the play assumes the value $P_x$, the provided stiffness of the bearing moves the resonance frequency to essentially agree with an overtone of the rotating speed. The vibration level therefore increases considerably around time t1. When the rotating machine further heats up, the play is further reduced and the resonance frequency is further changed and is not excited any more. The vibration level decreases. After a while, the rotating motor reaches a steady-state, having a steady-state play of $P_{steady}$ and a relatively low vibration level.

Figure 5B:
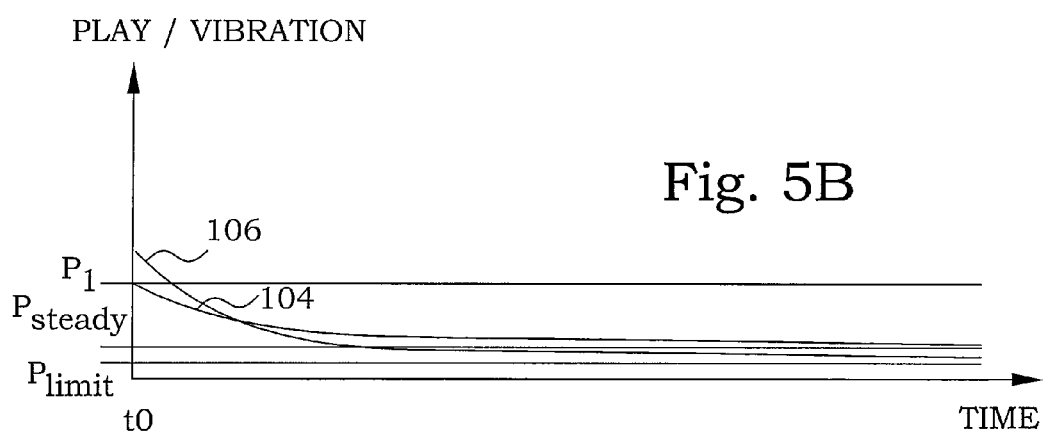
FIG. 5B is a graphical representation of the development of play and vibration for the present invention with time.
Figure 5C:
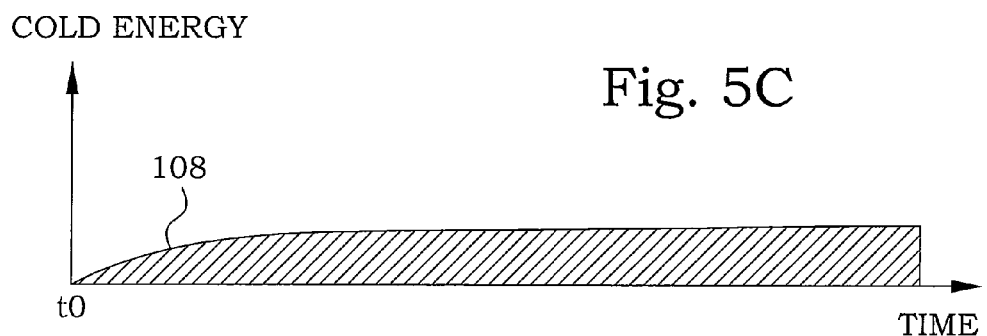
FIG. 5C is a graphical representation of the development of heat exchange for the present invention with time.

Such a situation is obviously not advantageous. FIGS. 5B and 5C illustrate a situation where cooling of the bearing is provided. The designed play at ambient temperature can then be reduced to $P_1$, being smaller than the play causing the vibration resonance. When the machine starts, the bearing is started to be cooled down. This is illustrated by the curve 108 in FIG. 5C, illustrating the cooling power of a fluid supplied to a cavity in the bearing housing. This cooling prohibits the reduction of the play, and the play, illustrated by curve 104 soon reaches the steady-state play $P_{steady}$. Similarly, the vibrations, illustrated by curve 106, nicely reduce to the steady-state level.

A drawback is, however, that continuous cooling is needed during the entire operation. A cooling energy corresponds to the hatched area in FIG. 5C. Furthermore, if the cooling is malfunctioning, the play will be reduced further, reaching the limit play $P_{limit}$, below which the bearing is exposed for damage risk.

Figure 5D:
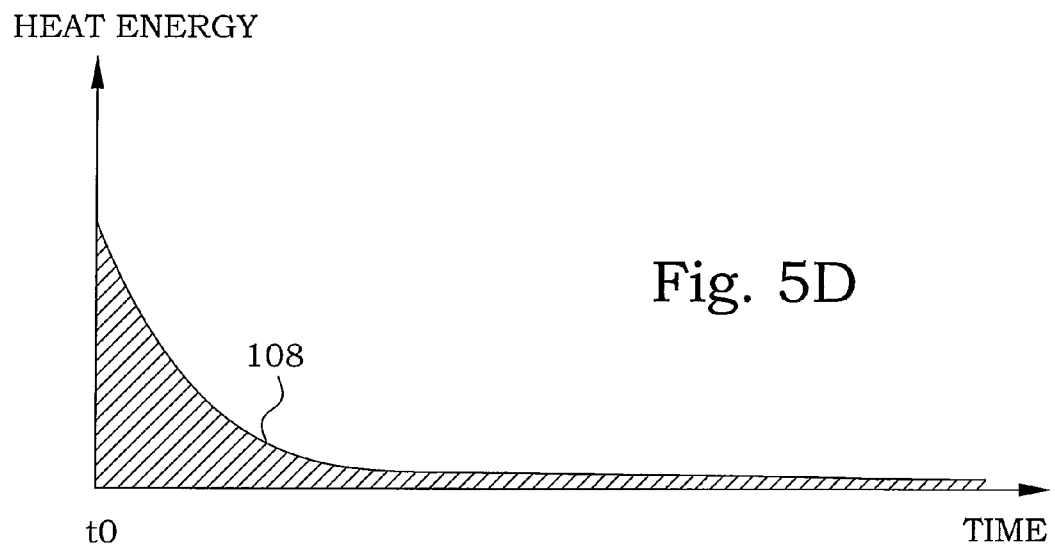
FIG. 5D is a graphical representation of the development of play and vibration for the present invention with time.

FIG. 5D illustrate a possible scenario, if both cooling and heating is available. Here, the designed play for the ambient temperature is again provided with a large margin. However, before, or at least in connection with the start of the rotating machine, the bearing is heated up to a temperature corresponding essentially to the operating steady-state temperature. The play is thereby reduced prior to the start of the rotating machine, thereby again avoiding the resonance play. The play and vibrations may again follow the curves of the diagram in FIG. 5B. When the rotating machine approaches steady-state operating temperature, the heating power of the bearings is successively reduced, as seen by the curve 110, until heating no longer is necessary. The amount of heating energy provided to the system corresponds to the hatched area and is thereby restricted to an initial phase of the operation, and during normal steady-state operation, no power for cooling or heating is required.

By additionally provide the possibility also for cooling the bearing, abnormally high operation temperatures, e.g. caused by high ambient temperatures, or extra-ordinary operation conditions causing a higher production of heat can be handled, essentially according to the ideas of FIG. 5C. From the above scenarios, it is easily understood that the provision of both heat and cold in the vicinity of the bearing is of great benefit. By having access to measurements of the different properties mentioned further above, the control of the vibration behaviour can be further improved. More sophisticated systems may also use information from different kinds of sensors, enabling a more intelligent control of the rotating machine.

The appearance of unforeseen resonance properties, such as the resonance behaviour in FIG. 5A, typically occurs at the initial use of a new machine. However, since resonance properties are dependent in a complex manner on many parameters, such problems may be encountered also at later stages. Wear of the bearing itself or items connected to the rotor may change the resonance behaviour considerably. Also if the rotor is operated at different operating conditions, the resonance properties may be different from time to time. It is thus of great advantage if the bearing play can be adapted in either direction at any time during the life of a rotating machine.

Figure 6:
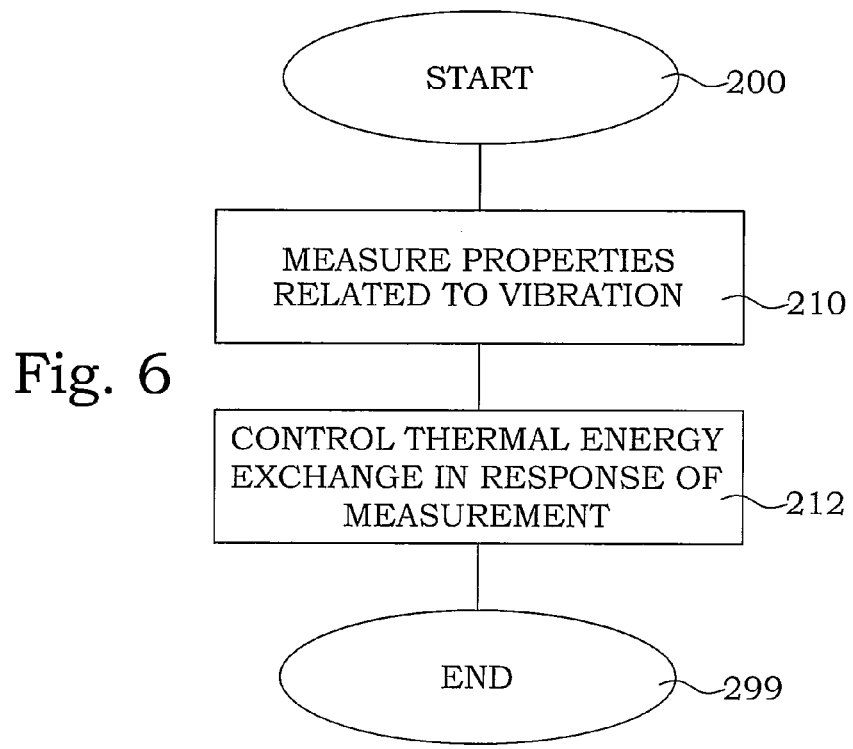
FIG. 6 is a schematic drawing of the main steps of an embodiment of a method according to the present invention.

FIG. 6 illustrates main steps of an embodiment of a method according to the present invention. The procedure for vibration control of a rotating machine starts in step 200. In step 210, properties of the stator and/or the rotor of the rotating machine are measured. The properties are at least related to vibration properties. In step 212, a thermal energy exchange in a bearing housing in the stator and/or the rotor is controlled in response of the measured properties. The thermal energy exchange allows provision of both heat and cold. The measuring and controlling steps are preferably performed during operation of the rotating machine. The procedure ends in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. Non-exclusive examples are the combinations of different sensors with thermal energy exchange either at the rotor or stator side. Furthermore, all the different types of thermal energy supply can also be provided at either the rotor or stator, and also be combined with any of the sensor solutions. The scope of the present invention is, however, defined by the appended claims.

The invention claimed is:

1. A rotating machine, comprising a constant speed rotating machine, comprising:
   a rotor;
   a stator;
   a radial bearing arranged for supporting radial forces between said rotor and said stator by mechanical contacts;
   a bearing housing attached to said stator and being in direct mechanical contact with said radial bearing, said bearing housing including at least one cavity therein;
   a conduit passing through said stator into said bearing housing for supplying a fluid to said stator into said bearing housing to either raise or lower the temperature of said bearing housing;
   thermal control means comprising a heater or cooler for controlling the temperature of said fluid during operation of said rotating machine;
   a senor arranged for measuring properties of a least one of said stator and said rotor; and
   said senor being connected to said thermal control means for providing signals associated with said measured properties;
   whereby said thermal control means can control said temperature of said bearing housing by said supply of said fluid in response to said measured properties in order to reduce vibrations in said rotating machine.

2. A rotating machine according to claim 1, wherein said measured properties of at least one of said stator and said rotor are associated with at least one measured property comprising bearing play or vibration behavior.

3. A rotating machine according to claim 2, wherein said sensor comprises a temperature sensor, arranged in the vicinity of said radial bearing, whereby said thermal control means is arranged to control said supply of said fluid for achieving a predetermined temperature at said temperature sensor.

4. A rotating machine according to claim 1, further comprising a fluid filling said cavity, wherein said fluid is selected from the group consisting of water and oil.

5. A rotating machine according to claim 1, wherein said rotating machine comprises a constant speed rotating machine.

6. A rotating machine according to claim 1, wherein said rotating machine exhibits a large mass at a large diameter of said rotor.

7. A refiner, comprising a rotating machine, comprising a constant speed rotating machine, said constant speed rotating machine comprising:
   a rotor;
   a stator;
   a radial bearing arranged for supporting radial forces between said rotor and said stator by mechanical contacts;
   a bearing housing attached to one of said stator and said rotor and being in direct mechanical contact with said radial bearing; said bearing housing including at least one cavity therein;
   a fluid reservoir;
   a conduit passing from said fluid reservoir through said one of said stator and said rotor into said bearing housing for supplying a fluid to said cavity in said bearing housing to either raise or lower the temperature of said bearing housing;
   thermal control means comprising a heater or cooler for controlling the temperature of said fluid during operation of said rotating machine;
   a sensor arranged for measuring properties of at least one of said stator and said rotor; and
   said sensor being connected to said thermal control means for providing signals associated with said measured properties;
   whereby said thermal control means can control said temperature of said bearing housing by said supply of said fluid in response to said measured properties in order to reduce vibration in said measured properties in order to reduces vibrations in said rotating machine.

* * * * *

UNITED STATES PATENT AND TRADEMARK OFFICE
CERTIFICATE OF CORRECTION

PATENT NO. : 8,303,185 B2  
APPLICATION NO. : 12/443206  
DATED : November 6, 2012  
INVENTOR(S) : Jan Laredius Page 1 of 2

It is certified that error appears in the above-identified patent and that said Letters Patent is hereby corrected as shown below:

Column 1, line 19, before "play" insert --and, in which--.  
Column 1, line 40, delete "to prefer" and insert therefor --preferable--.  
Column 1, line 55, "perature induced" should read --perature-induced--.  
Column 1, line 59, "causes" should read --cause--.  
Column 2, line 33, after "system" delete ",".  
Column 2, line 37, delete "an".  
Column 2, line 37, delete "an" and insert therefor --another--.  
Column 2, line 62, after "stator" insert --and--.  
Column 2, line 64, after "behavior" insert --.--.  
Column 3, line 42, after "for" (second instance) insert --the--.  
Column 3, line 45, "lease" should read --least--.  
Column 4, line 13, "there of" should read --thereof--.  
Column 4, line 20, after "invention" insert --;--.  
Column 5, line 17, after "being" insert --in--.  
Column 5, line 38, after "properties" insert --of--.  
Column 6, line 15, "to" should read --too--.  
Column 6, line 34, after "24" insert --,--.  
Column 6, line 47, delete "an".  
Column 6, line 59, "measures" should read --measure--.  
Column 7, line 6, "increase" should read --increases--.  
Column 7, line 18, "change" should read --changing--.  
Column 7, line 34, after "bearing" insert --,--.  
Column 7, line 38, delete "A" and insert therefor --at--.  
Column 7, line 43, after "102" insert --,--.  
Column 8, line 10, "illustrate" should read --illustrates--.  
Column 8, line 11, delete "is" and insert therefor --are--.  
Column 8, line 27, "provide" should read --providing--.  
Column 9, line 23, delete "stator into" and insert therefor --cavity in--.  
Column 9, line 28, delete "a" and insert therefor --at--.

Signed and Sealed this  
Fifth Day of February, 2013

Teresa Stanek Rea  
*Acting Director of the United States Patent and Trademark Office*

CERTIFICATE OF CORRECTION (continued)
U.S. Pat. No. 8,303,185 B2

Column 10, line 12, after "machine" delete ",".
Column 10, line 41, delete "measured properties in order to".
Column 10, line 42, delete "reduces vibrations in said".